(12) United States Patent
Kondo et al.

(10) Patent No.: US 8,730,565 B2
(45) Date of Patent: May 20, 2014

(54) ELECTROMAGNETIC WAVE RADIATION ELEMENT AND METHOD FOR PRODUCING SAME

(71) Applicant: NGK Insulators, Ltd., Nagoya (JP)

(72) Inventors: Jungo Kondo, Miyoshi (JP); Yuichi Iwata, Nagoya (JP); Tetsuya Ejiri, Kasugai (JP)

(73) Assignee: NGK Insulators, Ltd., Aichi-prefecture (JP)

( * ) Notice: Subject to any disclaimer, the term of this patent is extended or adjusted under 35 U.S.C. 154(b) by 0 days.

(21) Appl. No.: 14/021,014

(22) Filed: Sep. 9, 2013

(65) Prior Publication Data

US 2014/0002891 A1 Jan. 2, 2014

Related U.S. Application Data

(63) Continuation of application No. PCT/JP2012/057661, filed on Mar. 16, 2012.

(30) Foreign Application Priority Data

Mar. 17, 2011 (JP) ................................. 2011-058991

(51) Int. Cl.
*G02F 1/35* (2006.01)
*G02F 2/02* (2006.01)
*H01S 5/06* (2006.01)

(52) U.S. Cl.
USPC ................ 359/326; 359/328; 372/21; 372/22

(58) Field of Classification Search
USPC .......... 359/326–332; 372/21–22; 385/37, 122
See application file for complete search history.

(56) References Cited

U.S. PATENT DOCUMENTS 6,388,799 B1 5/2002 Arnone et al.
6,920,272 B2 * 7/2005 Wang ............................ 385/129

(Continued)

FOREIGN PATENT DOCUMENTS

JP 09-146131 A 6/1997
JP 2000-162656 A 6/2000

(Continued)

OTHER PUBLICATIONS

Hattori, T., "Intense Terahertz Pulse Generation by Pulse Front Tilting," Laser Research 2009;37(5):345-349.

(Continued)

*Primary Examiner* — Daniel Petkovsek
(74) *Attorney, Agent, or Firm* — Cermak Nakajima LLP; Tomoko Nakajima

(57) ABSTRACT

A device for irradiating an electromagnetic wave irradiates an electromagnetic wave having a target frequency in a range of 0.1 THz to 30 THz to the outside of a non-linear optical crystal. The device includes a main body composed of a non-linear optical crystal and a sub wavelength grating structure formed on a surface of the main body. The sub wavelength grating structure includes column shaped bodies regularly arranged on a surface of the main body. Each of the column shaped bodies includes a constant width part having a constant width and a base part provided from the surface toward the constant width part. A surface of the base part has a shape of an arc having a center of curvature in the outside of the base part viewed in a cross section of the column shaped body cut along a direction in which the column shaped bodies are arranged.

4 Claims, 8 Drawing Sheets

(56) References Cited

U.S. PATENT DOCUMENTS

| | | |
|---|---|---|
| 8,305,679 B2 | 11/2012 | Kondo et al. |
| 8,384,989 B2 | 2/2013 | Kondo et al. |
| 8,542,433 B2 * | 9/2013 | Kondo et al. ............ 359/326 |
| 2002/0024718 A1 | 2/2002 | Kawase et al. |
| 2002/0117623 A1 | 8/2002 | Cole |
| 2004/0072384 A1 | 4/2004 | Cole |
| 2011/0032600 A1 | 2/2011 | Kondo et al. |

FOREIGN PATENT DOCUMENTS

| | | |
|---|---|---|
| JP | 2002-72269 A | 3/2002 |
| JP | 2002-287370 A | 10/2002 |
| JP | 2003-177210 A | 6/2003 |
| JP | 2003-177263 A | 6/2003 |
| JP | 2004-521329 A | 7/2004 |
| JP | 2005-215638 A | 8/2005 |
| JP | 2009-175385 A | 8/2009 |
| JP | 2010-020120 A | 1/2010 |
| JP | 2011-39231 A | 2/2011 |
| JP | 2011-59670 A | 3/2011 |

OTHER PUBLICATIONS

Kanamori, Y., et al., "Broadband antireflection gratings fabricated upon silicon substrates," Optics Lett. 1999;24 (20):1422-1424.

Miyakoshi, H., et al., "Polymeric Wide-band Wave Plate Produced via Nanoimprint Subwavelength Grafting," Konica Minolta Technology Report 2005;2:97-100.

Nishii, J., "Challenge for Low-Cost Production of High-Performance Optical Devices—Realization of Sub Wavelength Grating Structure via Glass Imprint Method," Synthesiology 2008;1(1):24-30.

International Search Report for PCT Patent App. No. PCT/JP2012/057661 (Apr. 17, 2012).

Written Opinion for PCT Patent App. No. PCT/JP2012/057661 (Apr. 17, 2012).

* cited by examiner

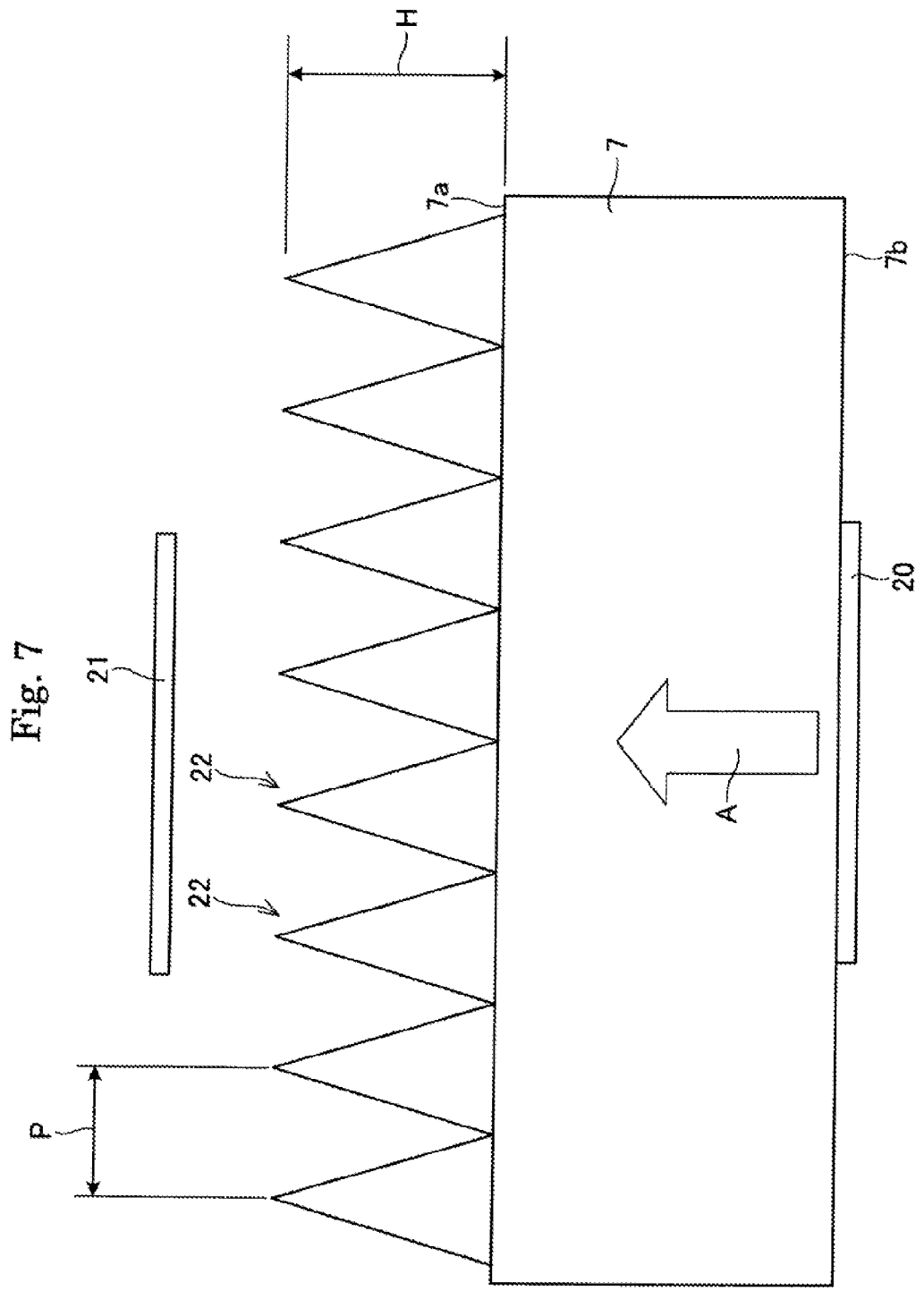

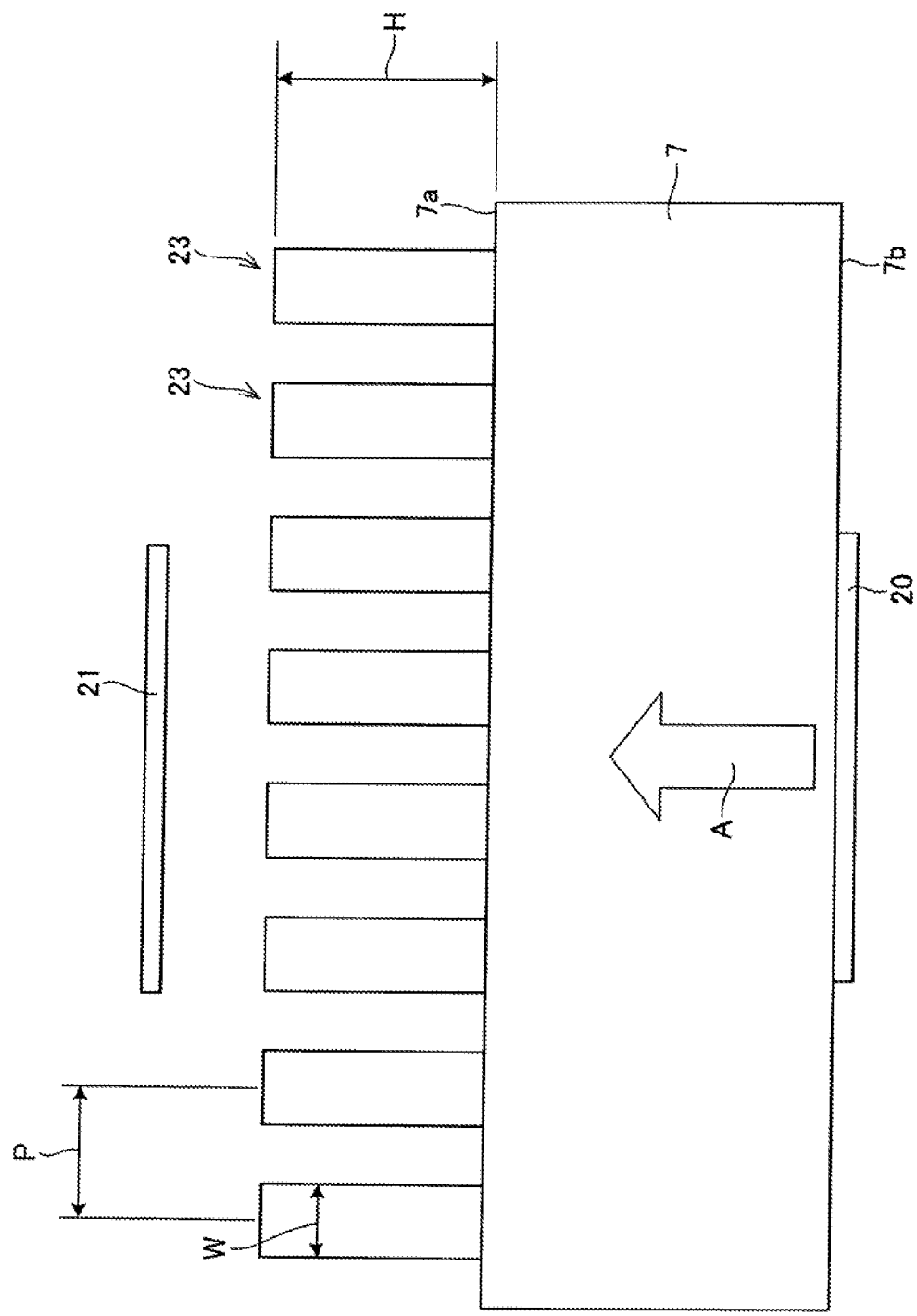

ELECTROMAGNETIC WAVE RADIATION ELEMENT AND METHOD FOR PRODUCING SAME

This application is a Continuation of, and claims priority under 35 U.S.C. §120 to, International Application No. PCT/JP2012/057661, filed Mar. 16, 2012, and claims priority therethrough under 35 U.S.C. §119 to Japanese Patent Application No. 2011-058991, filed Mar. 17, 2011, the entireties of which are incorporated by reference herein.

TECHNICAL FIELD

The present invention relates to a device of irradiating so-called terahertz wave and a method of producing the same

BACKGROUND ARTS

Terahertz waves are electromagnetic waves generally having a frequency of 0.3 THz to 10 THz, and are expected for basic fields such as physical properties, electrospectroscopy, bioscience, chemistry and pharmaceutical science and for applied fields of atmospheric environmental assessment, security, material test, food test and communication.

As a device for oscillating terahertz waves, it has been developed a backward wave oscillator (BOW) and photomixing in several hundreds GHz band and free electron energy laser, p-Ge laser and quantum cascade laser (QCL) for 1 THz or more. These devices, however, have problems in the miniaturization and improvement of output power.

On the other hand, it has been recently developed a device for oscillating a wide-band terahertz wave with an optical switch or rectification using a femtosecond laser as a light source and applied for time domain spectroscopy (TDS) or the like.

In addition to this, for generating terahertz wave using a non-linear optical crystal such as $LiNbO_3$, it has been known methods of utilizing quasi phase matching (QPM) and of utilizing phonon polariton. Such methods are expected for applications requiring sources generating the terahertz wave having high temporal and spatial coherency.

It is further possible to generate wide-band terahertz wave by optical current using the femtosecond optical pulses as described above, so as to provide a generation system suitable for wide variety of applications.

Patent document 1 (Japanese Patent Publication No. H09-146131A) discloses a device of oscillating terahertz wave using a y-plate or z-plate of $LiNbO_3$. That is, a light source irradiates a pump wave into a substrate and another light source irradiates an idler wave into the substrate. The pump wave (frequency $\omega 1$), idler wave (frequency $\omega 2$) and polariton (terahertz wave: frequency $\omega T$) satisfy the law of conservation of energy ($\omega 1 = \omega 2 + \omega T$) and law of conservation of momentum (noncollinear phase matching condition: $k1=k2+kth$), so that polariton stimulated scattering is observed. In this case, due to the scattering property, the frequencies of the idler wave and terahertz wave are decided depending on the angles $\alpha$ and $\theta$ with respect to the optical axis of the pump wave.

According to the method, typically, the phase matching condition is satisfied when an angle $\alpha$ of wave vector k1 of the pump wave 3 and wave vector k2 of the idler wave is 0.5° to 1° and the terahertz wave 7 was oscillated (wavelength of 100 to 300 μm, frequency of 3 THz to 1 THz) at a high efficiency. Further, it is described that the terahertz wave is oscillated at an angle of 65 to 66° with respect to the idler wave. In the case that a y-plate is used, the crystal orientation is different. Therefore, the pump wave and idler wave propagate on a plane perpendicular to the substrate at an angle $\alpha$ to generate terahertz wave at an angle $\theta$ with respect to the pump wave.

However, (1) the crystal has a refractive index as high as 5.2 with respect to sub-milli wave (terahertz wave) so that total internal reflection occurs between the crystal and air. It is thus impossible to draw the terahertz wave into the air both in the cases of the y-plate and z-plate. (2) Optical loss in the crystal is large. For example, the optical intensity of the terahertz wave is reduced to about 0.1 percent with respect to a propagation distance of 3 mm of the terahertz wave. For these problems, according to Japanese Patent Publication No. H09-146131A, a grating is provided on a side face of the substrate to enable the emitting of the terahertz wave into the air at a high efficiency.

According to Japanese Patent Publication No. 2002-72269A, an exciting laser light, having a single frequency is irradiated and an idler wave having a single frequency is used for optical injection to generate terahertz wave having a high output power and whose spectrum line width can be reduced. A silicon prism is, however, used for drawing the terahertz wave.

Further, according to patent document 3 (Japanese Patent application No. 2009-185768; Japanese Patent Publication No. 2011-059670A), the applicant disclosed that terahertz wave is made cut-off state in a substrate having a thickness of 20 μm or smaller and irradiated into air at a high efficiency.

According to optical rectification using femto-second pulses, terahertz wave is generated by differential frequency generation of two frequency components included in wide spectrum of the femto-second optical pulses themselves. At this time, various differential frequencies are generated at the same time among the spectrum of incident light. As a result, the spectrum of the terahertz wave is composed of wide band having a frequency width of about reciprocal number of the width of pulse time period of the femto-second optical pulses.

The terahertz wave generation utilizing femto-second optical pulses is fundamentally same as the parametric process as described above. As described in non-patent document 4 "Intense Terahertz Pulse Generation by Pulse Front Tilting" "Laser Research" 37(5), pages 345 to 349 (2009)), it becomes recently possible to generate planar terahertz wave at a high intensity by tilting the optical pulse front, which is expected in applications of imaging.

As described above, according to prior devices, when terahertz wave is generated in parametric oscillation, considerable portion of it is absorbed in the inside of a crystal. Moreover, as the refractive index of the crystal is considerably larger than that of air, it is not possible to draw the terahertz wave to the outside without providing a prism or grating on a surface of the crystal. The intensity of the terahertz wave, which can be oscillated from the device, is low and unpractical, and it is required a step of providing the prism or grating on the surface of the crystal. Further, accurately, it is further generated a propagating loss or reflection loss due to the prism or grating.

On the other hand, in visual light or infrared light, it has been tried to subject a surface of an optical part to fine processing to provide a three-dimensional structure which is provided regularly at an interval smaller than a wavelength of light, so as to provide the function of preventing reflection on the surface of the optical part (Patent documents 4, 5, 6 and 7; Non-Patent documents 1, 2 and 3).

(Patent document 1) Japanese patent Publication No. H09-146,131A (Patent document 2) Japanese patent Publication No. 2002-072,269A (Patent document 3) Japanese patent Application No. 2009-185,768A; Japanese Patent Publication No. 2011-059670A
(Patent document 4) Japanese patent Publication No. 2002-287,370A
(Patent document 5) Japanese patent Publication No. 2004-521,329A
(Patent document 6) Japanese patent Publication No. 2003-177,210A
(Patent document 7) Japanese patent Publication No. 2010-020,120A
(Non-patent document 1) "OPTICS LETTERS," Vol. 24, No. 20, October 15, p 1422 "Optical Society of America"
(Non-patent document 2) ΠKONICA MINOLTA TECHNOLOGY REPORT] Vol. 2 (2005) pages 97 to 100 "Polymeric Wide-band Wave Plate Produced via Nanoimprint Sub wavelength Grating"
(Non-patent document 3) ΠSynthesiology] Vol. 1, No. 1 (2008) pages 24 to 30 "Challenge for Low-Cost Production of High-Performance Optical Devices—Realization of Sub Wavelength Grating Structure via Glass imprint method."
(Non-patent document 4) "Intense Terahertz Pulse Generation by Pulse Front Tilting" "Laser Research" 37(5), pages 345 to 349 (2009))

SUMMARY OF THE INVENTION

The inventors focused on the sub wavelength grating structures as described in the documents as described above, and studied to utilize them for preventing reflection of terahertz wave. Such study have not been tried yet. As it was actually studied and produced, however, various problems are found and it was proved to be difficult to apply.

That is, according to the descriptions of Patent document 7, for example, a depth "d" of roughness on the surface of the device is represented as the following formula.

$$d = \lambda/(4\sqrt{n \times n0})$$

("λ" represents a wavelength of light, "n" represents a refractive index of a crystal forming the device, and "n0" represents a refractive index of air=1)

Therefore, as it is assigned that the frequency of light is 1 THz, λ=300 μm and "n" is a refractive index of lithium niobate single crystal of 5.2, for example, it would be required a depth of 3.28 μm. According to the above described document, such three-dimensional grating was formed by nanoimprint, reactive ion etching by semiconductor process or wet etching (fluonitric acid in the case of LN series). Since lithium niobate and lithium tantalite single crystals are materials which are difficult to process, however, it is difficult to form fine roughness having a depth of 30 μm or larger.

An object of the present invention is to provide a device of irradiating terahertz wave from a crystal of a high refractive index, such as lithium niobate or the like, to the outside, at a high efficiency by utilizing a sub wavelength grating structure.

The present invention provides a device of irradiating an electromagnetic wave having a target frequency in a range of 0.1 THz to 30 THz to the outside of a crystal. The device includes a main body composed of a non-linear optical crystal and a sub wavelength grating structure formed on a surface of the main body. The sub wavelength grating structure includes column shaped bodies regularly arranged on a surface of the main body. Each of the column shaped bodies includes a constant width part having a constant width and a base part provided from the surface of the main body toward the constant width part. A surface of the base part has a shape of an arc having a center of curvature in the outside of the base part viewed in a cross section of the column shaped body cut along a direction in which the column shaped bodies are arranged.

The present invention further provides a device of irradiating an electromagnetic wave having a target frequency in a range of 0.1 THz to 30 THz to the outside of a crystal. The device includes a main body composed of a non-linear optical crystal and a sub wavelength grating structure formed on a surface of the main body. The sub wavelength grating structure includes column shaped bodies regularly arranged on a surface of the main body. Each of the column shaped bodies are formed by grinding using a peripheral cutting edge.

The present invention further provides a method of producing a device of irradiating an electromagnetic wave having a target frequency in a range of 0.1 THz to 30 THz to the outside of a crystal. A surface of a main body composed of a non-linear optical crystal is subjected to grinding using a peripheral cutting edge to form a sub wavelength grating structure including column shaped bodies regularly arranged on the surface of the main body.

According to the device of the present invention, by utilizing the sub wavelength grating structure, it is possible to provide the device capable of irradiating terahertz wave from a crystal of a high refractive index such as lithium niobate single crystal or the like, to the outside of the crystal at a high efficiency. In particular, each of the column shaped bodies includes the constant width part having a constant width on the side of tip end and the base part provided from the surface of the main body to the constant width part, and the side face of the base part has a shape of an arc whose center of curvature is present outside of the base part. It is thereby possible to obtain a peak transmittance higher than that obtained in the case of providing a sub wavelength grating structure having column shaped bodies each having another shape.

The inventors further found that, by subjecting a surface of a crystal main body to grinding using a peripheral cutting edge, it is possible to provide a sub wavelength grating structure having a depth and shape, sufficient for preventing reflection of the terahertz wave, on the surface of the main body, and made the present invention.

BRIEF DESCRIPTION OF THE DRAWINGS

FIG. 7 is an enlarged view showing a shape of a column shaped body according to another comparative example.

FIG. 8 is an enlarged view showing a column shaped body according to still another comparative example.

EMBODIMENTS OF THE INVENTION

A sub wavelength grating structure (SWG) means a fine periodic structure which is below a diffraction limit with respect to a predetermined light. In the case that the light is made incident into the structure, the light cannot recognize the detailed structure so that the light behaves as if there would be a media having an average of refractive indices of those in the structure. It is particularly known a structure called "moth-eye" structure having the effect of preventing reflection.

Figure 1:
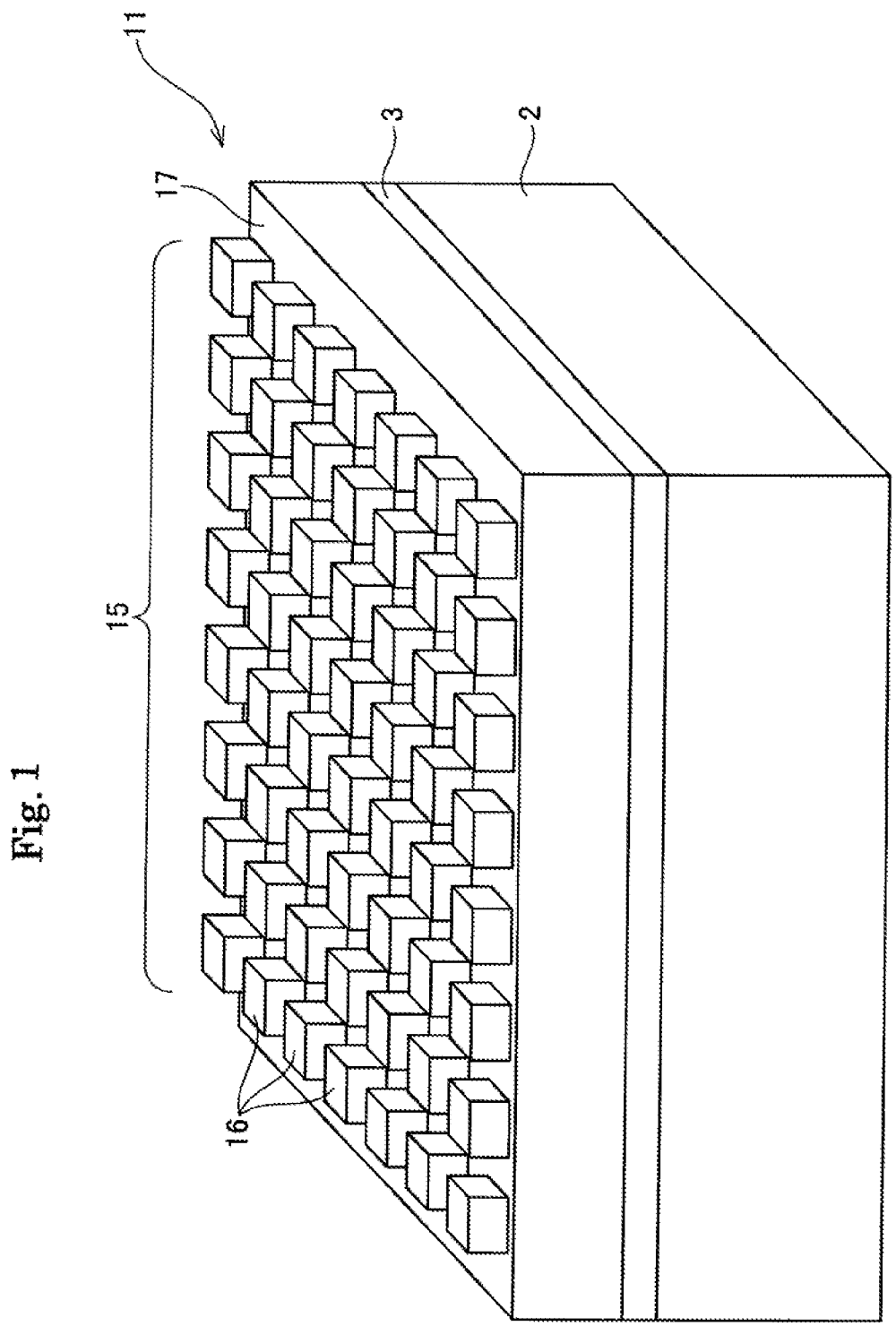
FIG. 1 is a perspective view schematically showing a device 11 according to a comparative example.

For example, according to a device 11 of a comparative embodiment shown in FIG. 1, a sub wavelength grating structure 15 is formed on a surface of a main body 17 composed of a non-linear optical crystal. The sub wavelength grating structure 15 is composed of many column shaped bodies 16 regularly formed horizontally and vertically. Spaces are formed between the adjacent column shaped bodies, and the surface of the main body 17 is exposed under the spaces as a flat face. Each of the column shaped bodies has a shape of a tetragonal column.

According to the inventor's study, however, it is difficult to form such column shaped body deeply in the non-linear optical crystal, and it is thus difficult to realize mass production of the sub wavelength grating structure for preventing reflection of terahertz wave. Further, according to the column shaped bodies having such shape, it is proved to be difficult to improve the transmittance of light having a target frequency exceeding a some degree.

Figure 2:
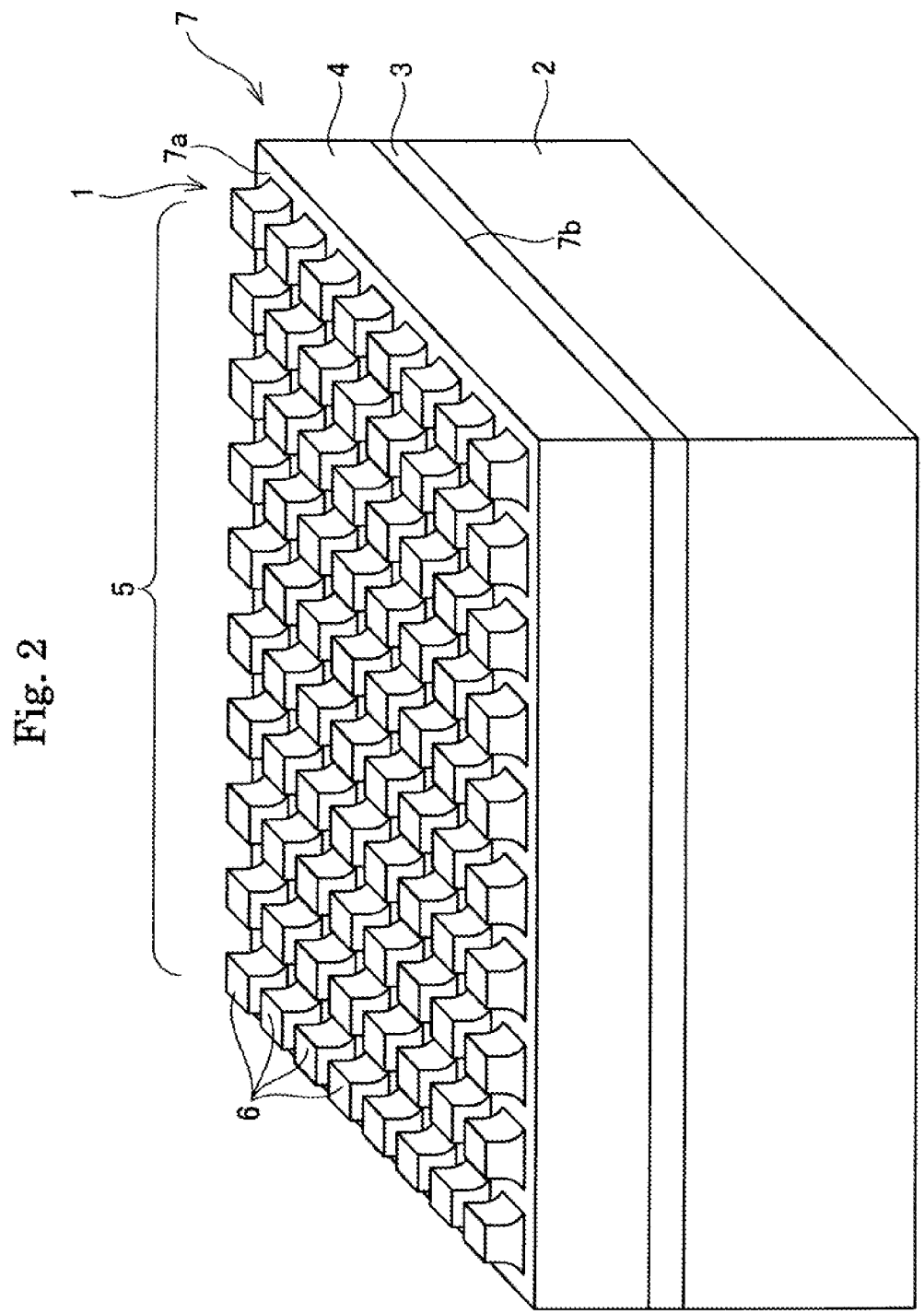
FIG. 2 is a perspective view schematically showing a device 1 according to the inventive example 1.
Figure 3:
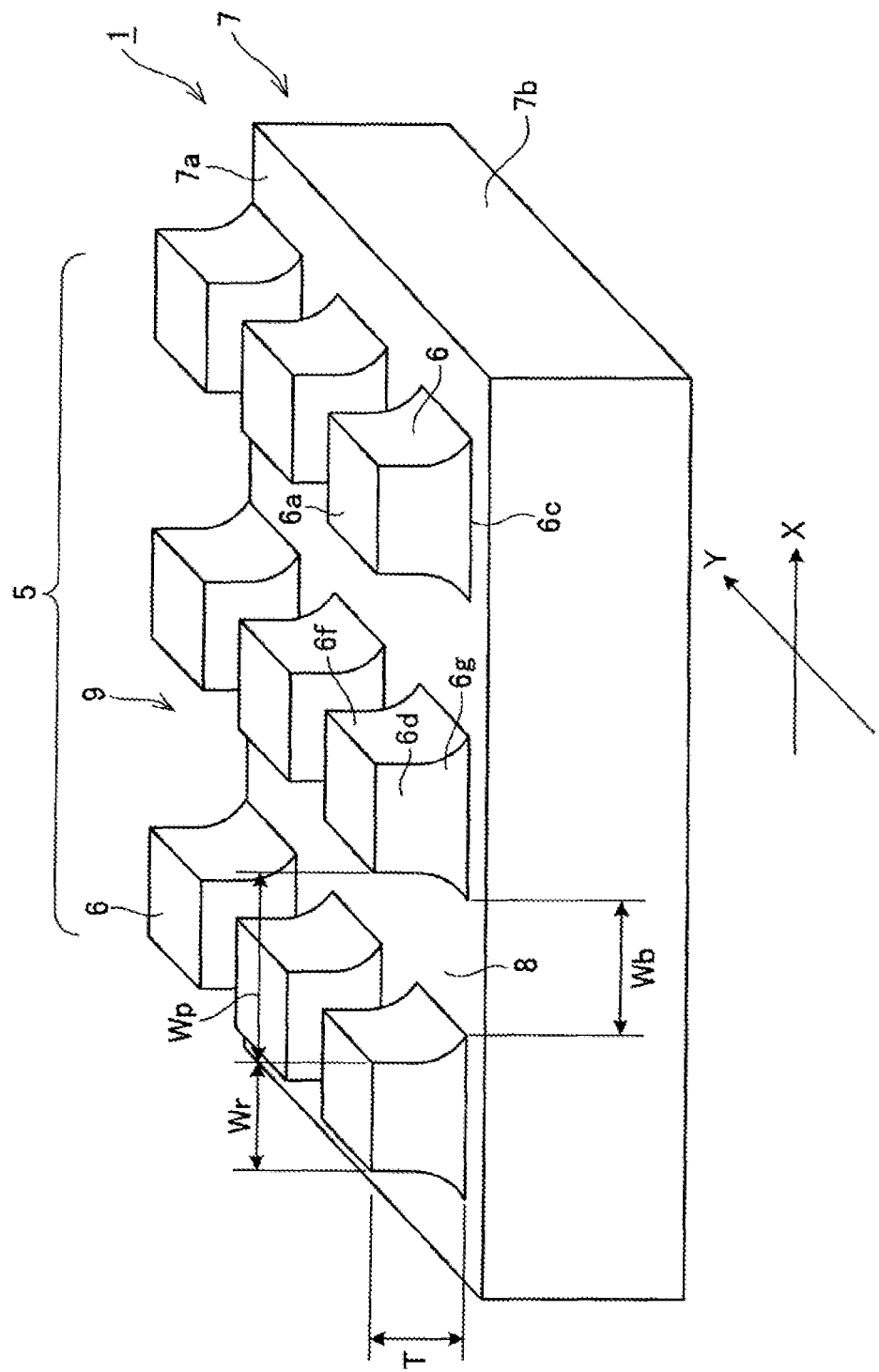
FIG. 3 is an enlarged view of a part of the device 1 shown in FIG. 2.
Figure 4:
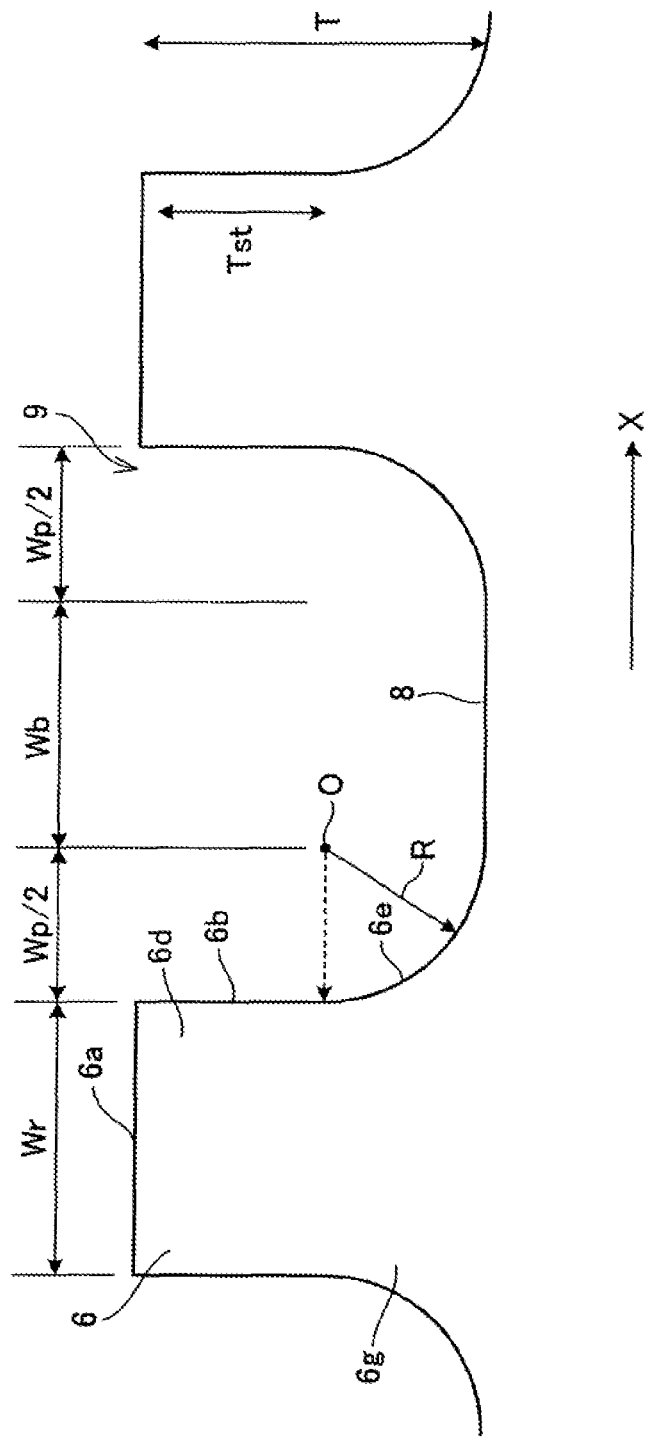
FIG. 4 is an enlarged view showing a column shaped body of the device shown in FIG. 2.

FIGS. 2, 3 and 4 show a device according to an embodiment of the present invention.

According to the present example, a bottom face 7b of a main body 7 made of a non-linear optical crystal is adhered to a supporting body 2 through an adhesive layer 3. An upper face of the main body 7 functions as a face 7a of irradiating an electromagnetic wave. A sub wavelength grating structure 5 is formed on the side of the irradiating face 7a of the main body 7 to facilitate the irradiation of the electromagnetic wave from the inside of the crystal to the outside and to prevent reflection of the electromagnetic wave at the surface of the crystal. The sub wavelength grating structure 5 is composed of column shaped bodies 6 regularly arranged vertically and horizontally. The column shaped bodies 6 are arranged in two directions "X" and "Y", respectively, which are intersected with (preferably perpendicular to) each other.

As shown in FIG. 4, each of the column shaped bodies 6 includes a constant width part 6d on the side of the end and a base part 6g extending from a surface 8 of the main body to the constant width part 6d. A flat face 6a is formed at the upper end of the constant width part 6d. The constant width part 6d has a shape of a tetragonal pillar as a whole and has a width "Wr" which is substantially constant. Wall faces 6b of the constant width part 6d is a flat face.

A base part 6g is formed under the constant width part 6f. When the column shaped body is viewed at a cross section cut along the direction "X" or "Y" of the arrangement, a wall face 6e of the base part 6g has a shape of an arc having a center "O" of curvature. The center "O" of curvature is positioned in the outside of the column shaped body 6. According to the present example, a flat face 8 is further formed between the adjacent base parts 6.

Figure 5:
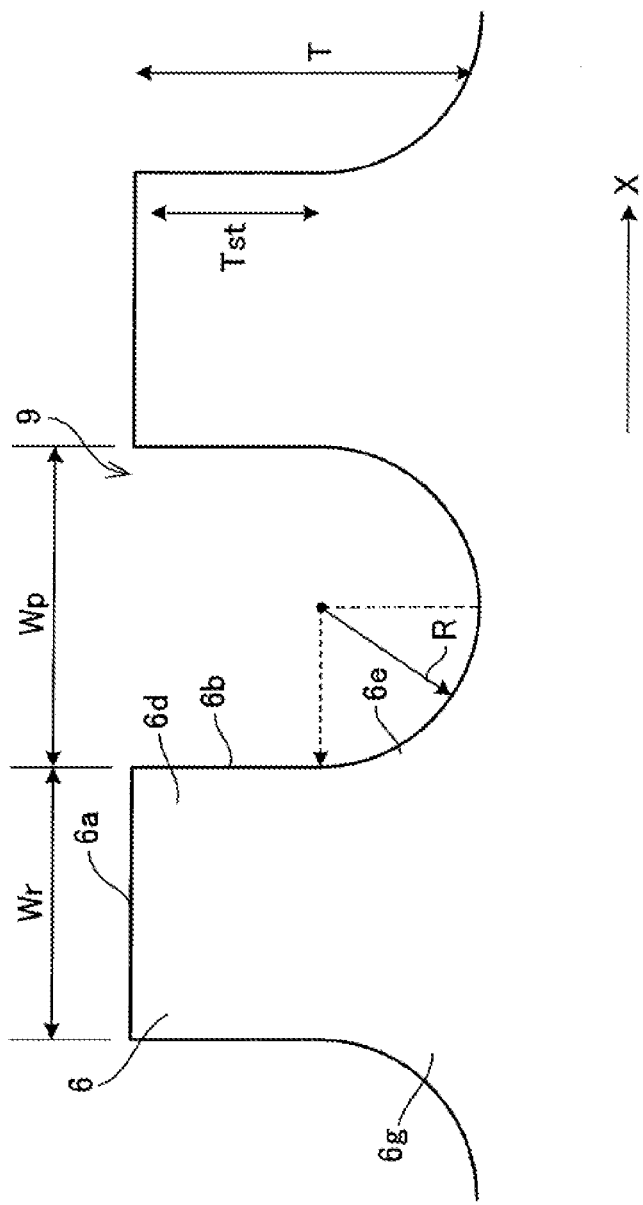
FIG. 5 is an enlarged view showing a column shaped body having another shape.

According to an example shown in FIG. 5, each of the column shaped bodies 6 includes a constant width part 6d on the side of the end and a base part 6g extending from the surface 8 of the main body to the constant width part 6d. A flat face 6a is formed at the upper end of the constant width part 6d. The constant width part 6d has a shape of a tetragonal pillar as a whole and has a width "Wr" which is substantially constant. An wall face 6b of the constant width part 6d is a flat face.

A base part 6g is formed under the constant width part 6f, and a wall face 6e of the base part 6g has a shape of an arc having a center "O" of curvature. The center "O" of curvature is present in the outside of the column shaped body 6. According to the present example, a flat face is not formed between the adjacent base parts 6, and the wall faces 6e of the base parts 6 of the adjacent column shaped bodies are continuous with each other.

The inventive device can transmit an electromagnetic wave having a target frequency in a range of 0.1 THz to 30 THz to the outside of a crystal. Dimensions of the sub wavelength grating structure of the present invention are adjusted so that the transmittance at the target frequency takes its maximum value, and it is not required that it has a high transmittance over the whole frequency range of 0.1 THz to 30 THz.

The non-linear optical crystal forming the main body is a dielectric material such as lithium niobate, lithium tantalate, lithium niobate-lithium tantalate solid solution, KTP and KN. It may be doped, for example with magnesium oxide, for reducing optical damage. Further, as to lithium niobate, it may be used congruent composition as well as stoichiometric composition. Further, there is no dependency on the orientation of the substrate and a face having any orientation may be applied.

The column shaped bodies are regularly arranged in a plan view to form the sub wavelength grating structure. The arranging pattern is formed by general procedures of gratings. Preferably, the column shaped bodies are arranged in two directions lengthwise and crosswise ones. The two directions are intersected and the angle of the intersection may preferably be 85 to 95° and most preferable be right angle.

Further, according to the present invention, in a cross section of the column shaped body cut along the direction of the arrangement, a surface of the base part is arc shaped. Here, although the center of curvature of the surface of the base part may preferably be one, it may be plural.

According to a preferred embodiment, the side faces of the base parts are continuously formed with each other between the adjacent column shaped bodies. Further, according to a preferred embodiment, a flat face is formed between the base parts of the adjacent column shaped bodies.

According to the present invention, an electromagnetic wave oscillating source may be set in the outside of the device, the electromagnetic wave oscillated from the electromagnetic wave oscillating source is made incident into the device and then irradiated from the electromagnetic wave irradiating face of the device main body. Alternatively, an electromagnetic wave may be oscillated inside of the device based on parametric oscillation.

In the case of the parametric oscillation, pump wave is made incident into the device main body made of a non-linear optical crystal capable of parametric oscillation, so that idler and terahertz waves are generated in directions satisfying noncollinear phase matching condition. At this stage, a first laser light having a single frequency as the pump wave may preferably be used and a separate second laser light having a single frequency may preferably be injected in the direction of the generation of the idler wave.

For example, the pump wave is irradiated from a light source and the idler wave is irradiated from a light source, respectively, onto the device main body. At this stage, among the pump wave (frequency $\omega 1$), idler wave (frequency $\omega 2$) and polariton (terahertz wave: frequency $\omega T$), law of conservation of energy ($\omega 1 = \omega 2 + \omega T$) and law of conservation of momentum (Noncolliner phase matching condition: $k1 = k2 + kth$) are satisfied so that polariton stimulated scattering is observed. In this case, based on the scattering property, the wavelengths of the idler wave and terahertz wave are decided depending on angles $\alpha$ and $\theta$ with respect to the optical axis of the pump wave.

The frequencies of the pump, idler and terahertz waves, α and θ are decided by the parametric oscillating condition. Typically, the wavelength of the pump wave may preferably be 800 nm to 1600 nm, and α may preferably be 0.04° to 4°. In this case, θ is in a range of 65 to 62°.

Although the material of the supporting body is not particularly limited, a dielectric material such as lithium niobate, lithium tantalate, solid solution of lithium niobate and lithium tantalate, KTP and KN, a semiconductor such as GaP and ZnSe, and a glass such as quartz glass are listed. Further, on the viewpoint of improving the reliability and matching of thermal expansion with that of the device main body, the supporting body may preferably be made of the same material as the device main body.

The adhesive adhering the device main body and supporting body is preferably made of a material having a dielectric constant lower than that of the oscillating substrate. Specifically, the refractive index of the adhesive may preferably be 2 or lower. Although the specific examples of the adhesive is not particularly limited, an epoxy series resin adhesive, an acrylic type resin adhesive, a Cardo polymer type resin adhesive, a room-temperature curable type resin adhesive, a thermosetting type resin adhesive, ultraviolet curable type resin adhesive, and Alan Ceramics C (Trade Name, supplied by Toa Gosei Co. LTD.) (thermal expansion coefficient of $13 \times 10^{-6}$/K) may be listed.

Although the thickness of the adhesive layer is not particularly limited, the thickness may preferably be 0.5 μm or larger, on the viewpoint of preventing leakage of the terahertz wave.

The light sources for the pump and idler waves may preferably be a semiconductor laser or a solid laser excited by the semiconductor laser (YAG, $YVO_4$, YLF or the like), which is connected to the crystal directly with a butt joint or with a lens. Further, the light source may be guided with an optical fiber whose end face may be connected with the crystal directly with a butt joint or with a lens.

According to the present invention, the width "Wr" of the constant width part 6d is designed depending on the target frequency, and may preferably be 30 μm or smaller for obtaining peak transmittance in the terahertz band and may preferably be 1 μm or larger for maintaining mechanical strength of the column shaped body.

Further, the height "Tst" of the constant width part 6d is designed depending on the target frequency, and may preferably be 10 to 190 μm and more preferably be 15 to 90 μm, on the viewpoint of obtaining peak transmittance in the terahertz band. "Tst" may preferably be 0.5×R or more and 5×R or less with respect to the radius "R" of curvature.

Further, the height "T" of the column shaped body 6 is designed depending on the target frequency, and may preferably be 20 to 200 μm on the viewpoint of improving peak transmittance.

The width of each column shaped body is represented by "Wr+Wp". "Wp/2" represents a dimension of protrusion with respect to the side face 6b of the column shaped body 6 in horizontal direction. At this, "Wp" may preferably be 20 μm or larger on the viewpoint of improving transmittance of light at the target frequency. Further, as "Wp" is larger, a distance between the adjacent column shaped bodies becomes large so that its design becomes more difficult. "Wp" may thus preferably be 100 μm or smaller.

It is possible to adjust a pitch of the adjacent column shaped bodies by providing a flat face 8 between the adjacent column shaped bodies. The width "Wb" of the flat face 8 may thus be zero. As the width "Wb" of the flat face 8 becomes too large, the processing becomes difficult. The width may preferably be 20 μm or smaller on this viewpoint.

The grinding utilizing an outer peripheral edge may preferably be performed according to the following procedure. First, it is selected an outer peripheral edge (blade) for obtaining the desired shaped as described above. Then, the shape of the blade is adjusted (dressing). Then, the height position of the blade is adjusted at the surface of the substrate (Adjustment of zero point of height of blade). Then, the height and feed pitch of the blade are set so as to obtain desired groove depth, width of the column shaped body and width of the constant width part. Then, the rotational rate and feed speed of the blade and cut water amount are set. Then, it is performed processing of grooves in the directions "x" and "y", respectively.

EXAMPLES

Example 1

Figure 6:
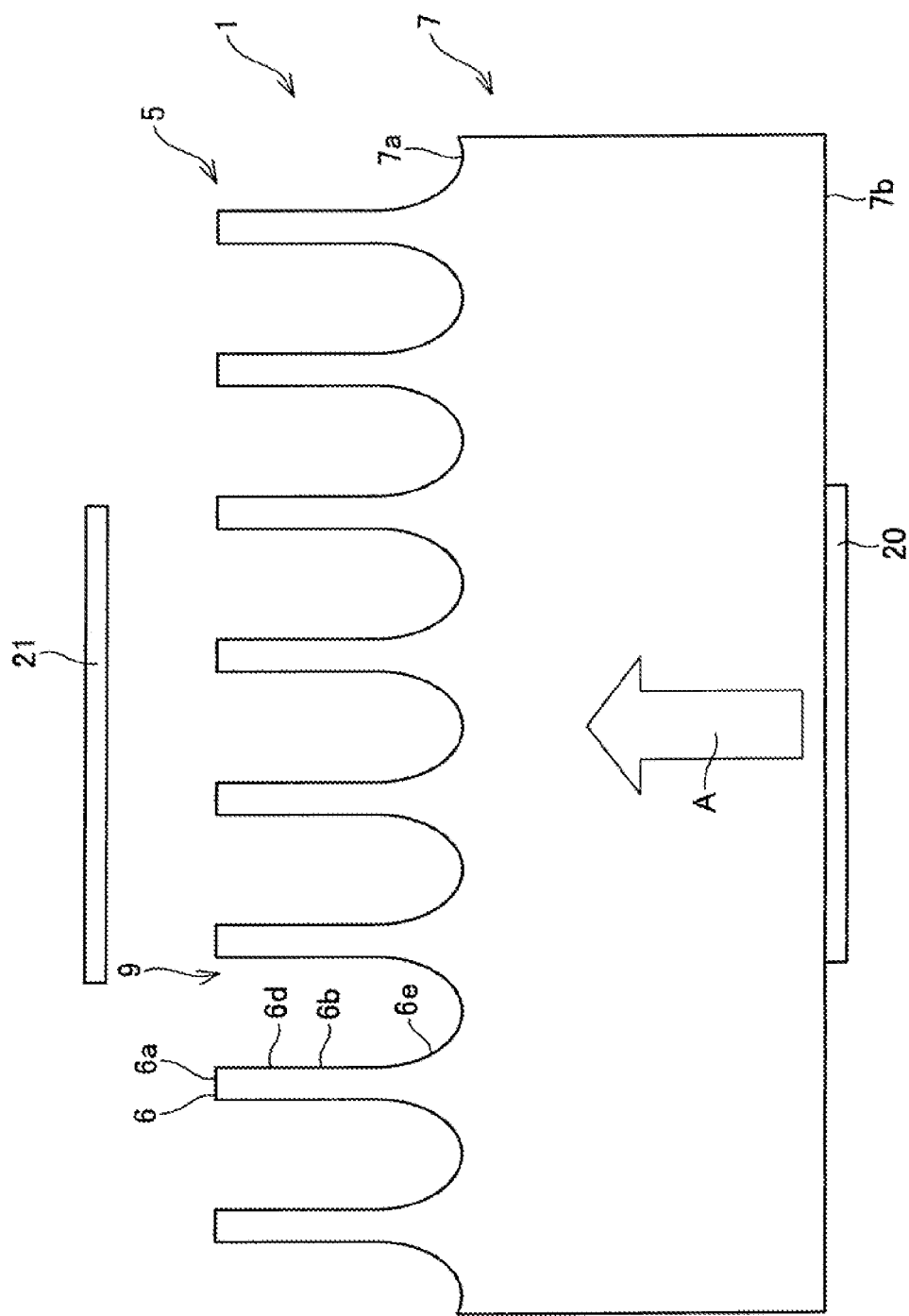
FIG. 6 is an enlarged view showing a shape of the device according to the inventive example.

It was produced an electromagnetic wave irradiating device having the shape shown in FIG. 6. However, this sub wavelength grating structure 5 was that described referring to FIG. 5 in which the supporting body and adhesive layer were not provided.

Specifically, it was prepared a main body 7 composed of a y-cut Mg-doped lithium niobate single crystal. The main body 7 had dimensions of 30 mm in length, 30 mm in width and 0.5 mm in thickness. A dicing saw was used and a blade was moved in the lengthwise and crosswise directions to perform the grinding to form the column shaped bodies 6. It was used the blade of electroforming bond type and having a width of 35 μm with grinding stones of #2000. Grooves were processed to a depth of 30 to 200 μm at processing conditions of a rotational rate of 30000 rpm and a speed of 0.5 mm/s. The feed of the blade was adjusted so that the pith was adjusted at 40 μm.

Dimensions of the respective parts were shown below.
Wr; 5 μm
Wp; 35 μm
Wb; 0 μm
T; 30 to 200 μm
Tst; 12.5 to 182.5 μm
R; 17.5 μm TDS measurement was carried out for measuring transmittance property of terahertz wave. That is, a light source 20 of terahertz wave was fitted onto the bottom face 7b of the device main body 7, and the terahertz wave was made incident into the inside of the device main body as shown by arrow "A". Then, a receiving unit 21 was set in air over the sub wavelength grating structure 5 to measure the receiving intensity. "Receiving intensity of light/intensity of oscillation" was assigned to the transmittance. As a result, the peak transmittance was proved to be 99 percent (at a frequency of 1 THz) at a height "T" of 35 μm and Tst of 17.5 μm. Further, it was proved that the peak frequency was shifted to lower frequency side as Tst was made larger.

Comparative Example 1

The same main body 7 as that in the Example 1 was used to measure the transmittance of electromagnetic wave, except that the sub wavelength grating structure was not formed on the surface of the device. In this case, the peak transmittance was not dependent on the frequency and 55 percent. This is due to the fact that lithium niobate single crystal has a refractive index of 5 at this frequency.

Comparative Example 2

It has been used a sub wavelength grating having a shape of a quadrangular pyramid as shown in FIG. 7 according to prior arts. However, since lithium niobate is a material hard to process, it is difficult to form the shape of quadrangular pyramid. For comparing with the structure of the Example 1, it was thus performed two-dimensional analysis based on simulation by FDTD method. The model of the structure of the Example 1 was applied as the simulation model and the dimensions were applied according to the model of the Example 1 as described above. However, as to the shape of the quadrangular pyramid, the width of the bottom face of the quadrangular pyramid was fixed at 40 μm and pitch was fixed at 40 μm, and the transmittance was calculated in a range of "H" of 30 μm to 200 μm.

As a result, the peak transmittance was proved to be 76 percent at the same height "H" of 35 μm as the Example 1 at a frequency of 1 THz). In this ease, it is proved that it is necessary to make the height "H" at 100 μm or larger for obtaining the peak transmittance of 90 percent or higher. It is thus proved to be possible to obtain a higher peak transmittance even at a smaller depth of the groove according to the inventive structure.

Comparative Example 3

The same main body as that in the Example 1 was used to measure the transmittance of electromagnetic wave, except that the sub wavelength grating structure having the shape shown in FIG. 8 was formed on the surface of the device main body. Here, each column shaped body 23 had a shape of a quadratic prism. Each column shaped body 23 had a height "H" of 35 μm, a pitch "P" of 40 μm and a width "W" of 20 μm.

Besides, the structure was produced according to pseudo-laser ablation method using excimer laser, and shot number of the laser was adjusted to adjust the depth and pitch.

As a result, the peak transmittance was proved to be 77 percent (at a frequency of 0.6 THz). According to this structure, the peak transmittance did not exceed 90 percent in the case that the height "T" was made larger in a range of "T" of 30 μm to 200 μm studied this time.

Although the present invention has been described with reference to particular embodiments, the invention is not limited thereto and various changes and modification may be made without departing from the scope of the appended claims.

The invention claimed is:

1. A device for irradiating an electromagnetic wave having a target frequency in a range of 0.1 THz to 30 THz to an outside of a non-linear optical crystal:

said device comprising a main body comprising a non-linear optical crystal and a sub wavelength grating structure formed on a surface of said main body, said sub wavelength grating structure comprising column shaped bodies regularly arranged on said surface of said main body;

wherein each of said column shaped bodies comprises a constant width part having a constant width and provided in a side of an end of said column shaped body, said column shaped body further comprising a base part provided from said surface of said main body toward said constant width part; and wherein a surface of said base part has a shape of an arc having a center of curvature in an outside of said base part, viewed in a cross section of said column shaped body cut along a direction in which said column shaped bodies are arranged.

2. The device of claim 1, wherein said surfaces of said base parts are made continuous with each other between said adjacent column shaped bodies.

3. The device of claim 1, wherein a flat face is formed between said base parts of said adjacent column shaped bodies.

4. The device of claim 1, wherein each of said column shaped bodies are formed by grinding using a peripheral cutting edge.

\* \* \* \* \*